(12) United States Patent
Jeffress (10) Patent No.: US 11,505,037 B1
(45) Date of Patent: Nov. 22, 2022

(54) CAMPER SHELL VENTILATION APPARATUS

(71) Applicant: Jim Jeffress, Elko, NV (US)

(72) Inventor: Jim Jeffress, Elko, NV (US)

( * ) Notice: Subject to any disclaimer, the term of this patent is extended or adjusted under 35 U.S.C. 154(b) by 0 days.

(21) Appl. No.: 17/400,536

(22) Filed: Aug. 12, 2021

(51) Int. Cl.
*B60H 1/26* (2006.01)
*B60H 1/24* (2006.01)

(52) U.S. Cl.
CPC ............. *B60H 1/262* (2013.01); *B60H 1/244* (2013.01); *B60H 1/245* (2013.01)

(58) Field of Classification Search
CPC ......... B60H 1/262; B60H 1/244; B60H 1/245
See application file for complete search history.

(56) References Cited

U.S. PATENT DOCUMENTS

| | | | |
|---|---|---|---|
| 3,738,621 A | 6/1973 | Anderson | |
| 3,868,060 A | 2/1975 | Mitchell | |
| 4,062,273 A * | 12/1977 | O'Connor | B61D 27/009 454/105 |
| 4,895,065 A * | 1/1990 | Lamparter | B60H 1/00457 454/162 |
| 5,560,219 A | 10/1996 | Vegara | |
| 5,672,101 A | 9/1997 | Thomas | |
| 5,716,269 A | 2/1998 | Garbooshian | |
| 6,546,744 B1 | 4/2003 | Cavender | |
| 8,550,538 B1 | 10/2013 | Brandenburg | |
| 2011/0297659 A1 * | 12/2011 | Bixler | B60H 1/2225 219/201 |

* cited by examiner

*Primary Examiner* — Jessica Yuen (57) ABSTRACT

A camper shell ventilation apparatus for ventilating a camper shell on a pickup truck includes a vent body coupled to a shell top of the camper shell. A blower body has a blower flange configured to be coupled to an inner side of the shell top of the camper shell below the vent body. A blower bottom side has an exhaust aperture extending through to a blower interior and a blower front side has an output aperture extending through to the blower interior. A blower is coupled to the blower body and is in fluid communication with each of a vent aperture and the output aperture to blow air into the camper shell. A power switch is coupled within a cab of the pickup truck to control the blower.

8 Claims, 7 Drawing Sheets

CAMPER SHELL VENTILATION APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to ventilation devices and more particularly pertains to a new fan for ventilating a camper shell on a pickup truck. The present device includes an intake vent and a blower fan coupled to the camper shell, as well as a control switch that can be mounted within the cab of the truck.

(2) Description of Related Art Including Information Disclosed Under 37 CFR 1.97 and 1.98

The prior art relates to ventilation devices. Most existing devices include various shapes of air intake for truck rears yet are not designed to mount on camper shells. Of those that are, those with electronic fans cannot be controlled from within the cab of the truck.

BRIEF SUMMARY OF THE INVENTION

An embodiment of the disclosure meets the needs presented above by generally comprising a vent body having a vent top side, a vent bottom side, and a vent sidewall, a vent aperture extending from the vent top side through the vent bottom side. The vent bottom side is configured to be coupled to an outer side of a shell top of a camper shell of a pickup truck. A blower body has a blower flange configured to be coupled to an inner side of the shell top of the camper shell below the vent body, a blower front side, a blower back side, a blower left side, and a blower right side extending from the blower flange and defining a blower interior. A blower bottom side has an exhaust aperture extending through to the blower interior. The blower front side has an output aperture extending through to the blower interior. A blower is coupled to the blower body within the blower interior. The blower is in fluid communication with each of the vent aperture and the output aperture to blow air into the camper shell. The blower has a wiring configured to be in operational communication with a fuse box of the pickup truck. A power switch is configured to be coupled within a cab of the pickup truck and is in operational communication with the fuse box to control the blower.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 9 thereof, a new fan embodying the principles and concepts of an embodiment of the disclosure and generally designated by the reference numeral 10 will be described.

As best illustrated in FIGS. 1 through 9, the camper shell ventilation apparatus 10 generally comprises a vent body 12 having a vent top side 14, a vent bottom side 16, and a vent sidewall 18. A vent aperture 20 extends from the vent top side 14 through the vent bottom side 16. The vent body 12 may be rectangular with rounded corners. The vent top side 14 has a perimeter portion 22 and a raised central portion 24. The raised central portion 24 is louvered to allow air flow through the vent aperture 20. The vent bottom side 16 is configured to be coupled to an outer side 26 of a shell top 28 of a camper shell 30 of a pickup truck 32. The vent body 12 may be of the type included in the roof ventilator product sold by Polar Manufacturing.

Figure 1:
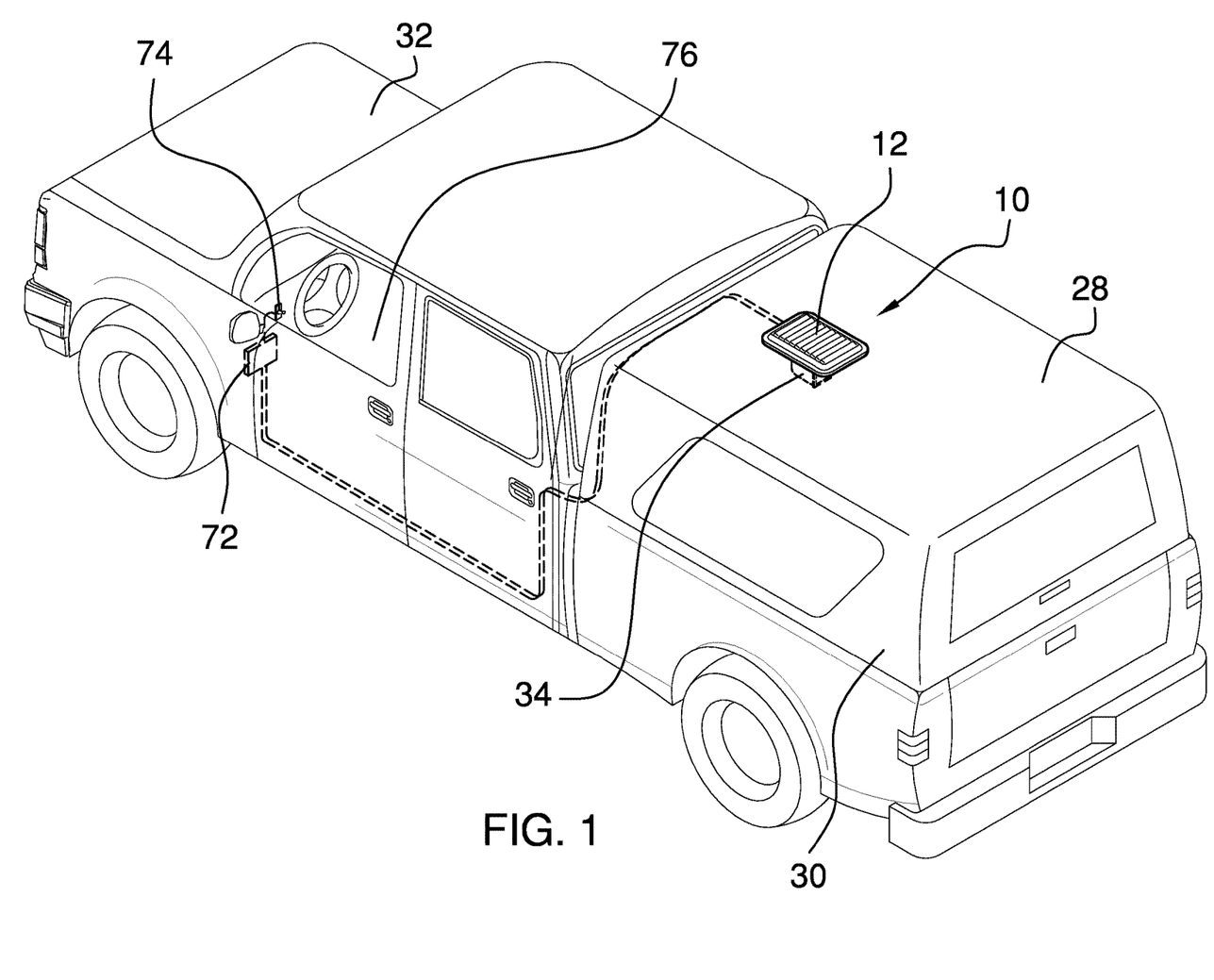
FIG. 1 is an isometric view of a camper shell ventilation apparatus according to an embodiment of the disclosure.
Figure 2:
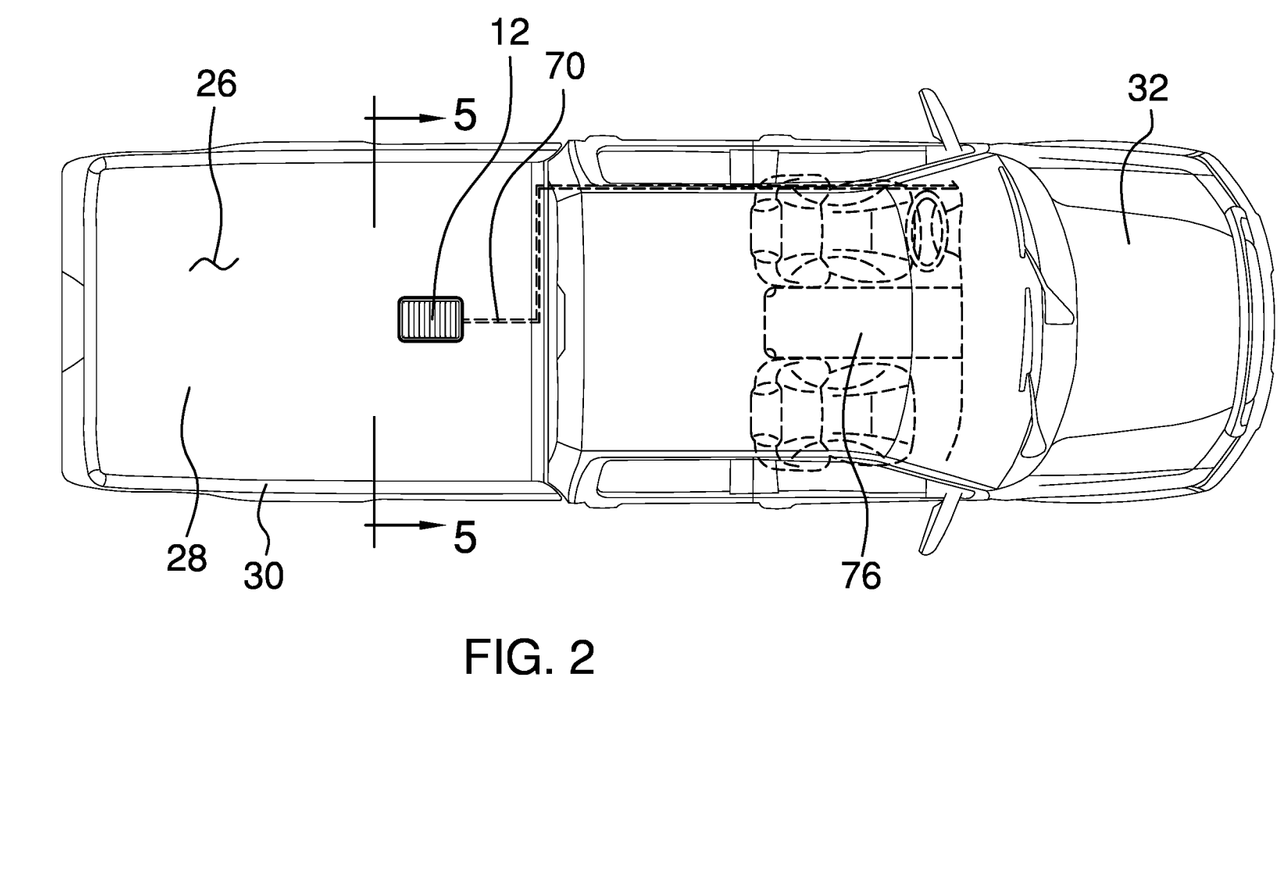
FIG. 2 is a top plan view of an embodiment of the disclosure.
Figure 3:
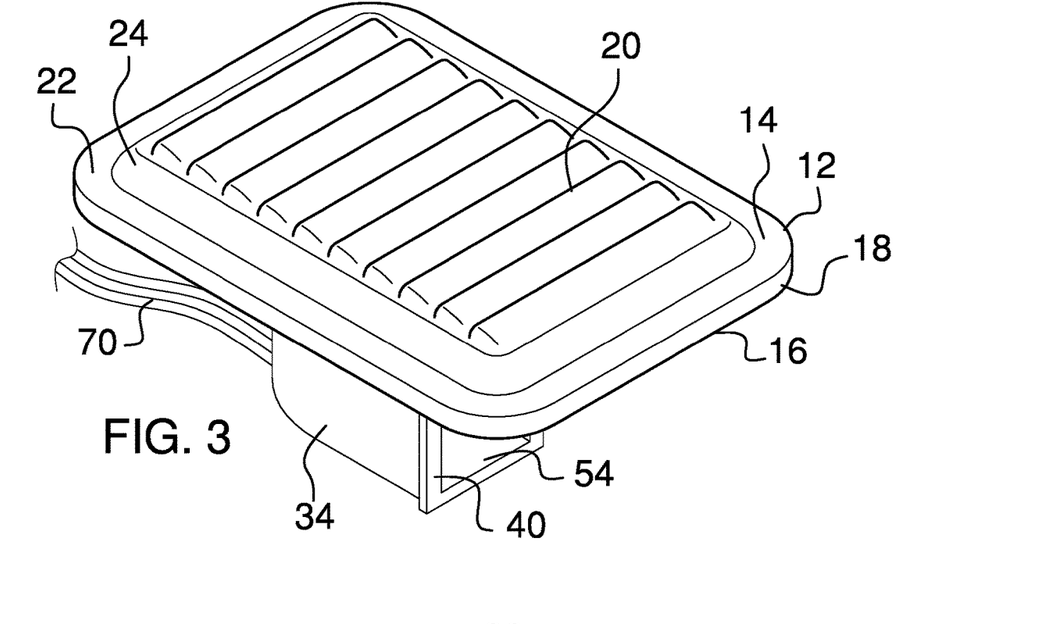
FIG. 3 is an isometric view of an embodiment of the disclosure.
Figure 4:
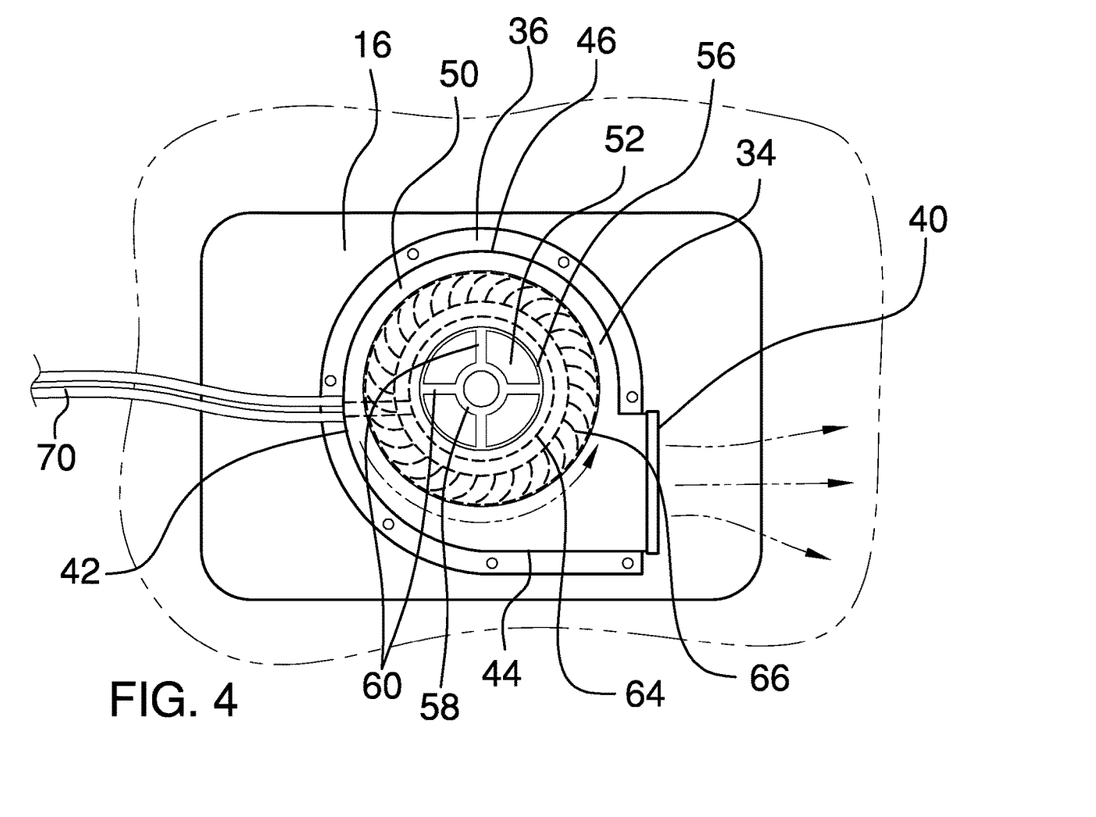
FIG. 4 is a bottom plan view of an embodiment of the disclosure.
Figure 5:
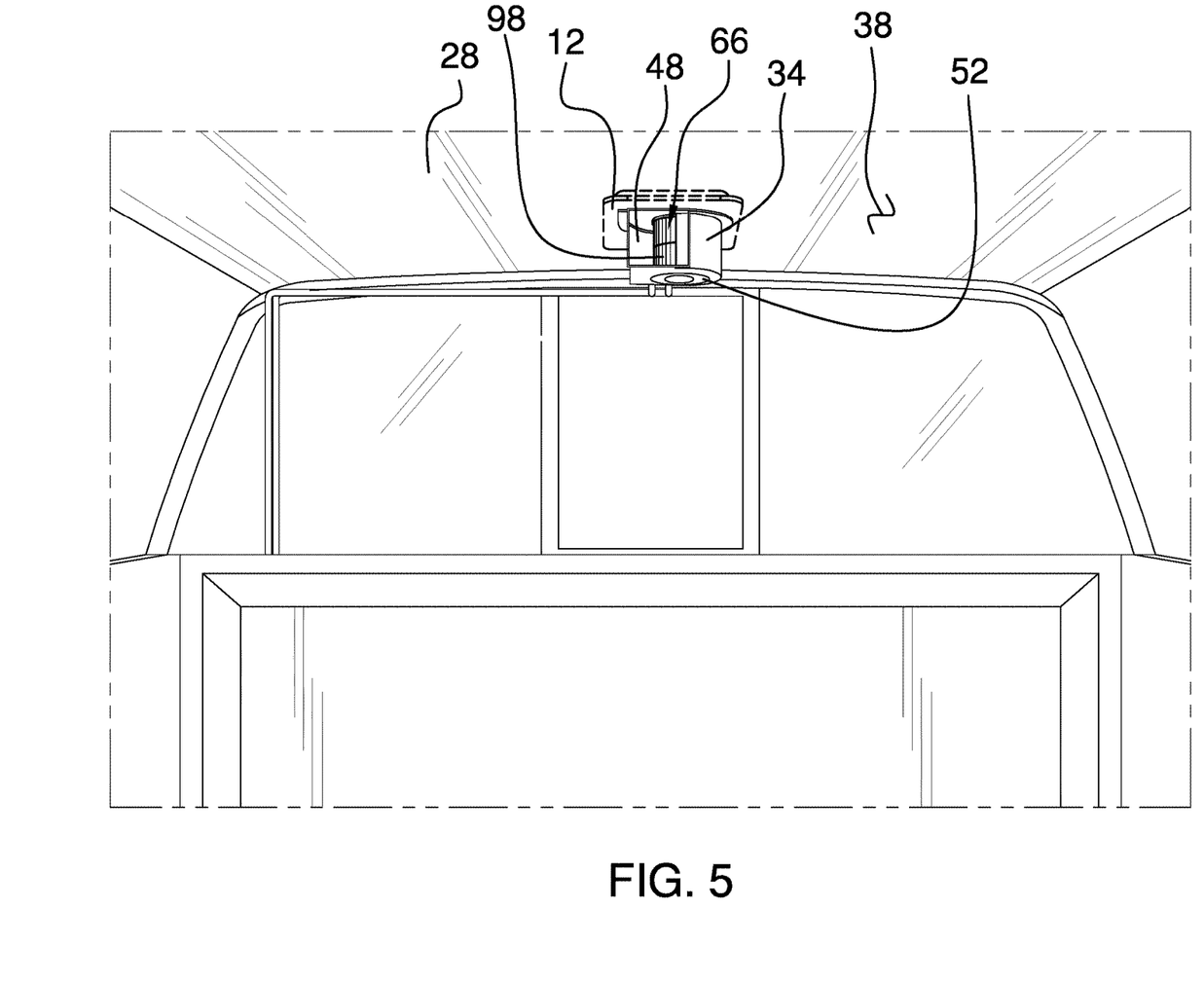
FIG. 5 is an isometric view of an embodiment of the disclosure.
Figure 6:
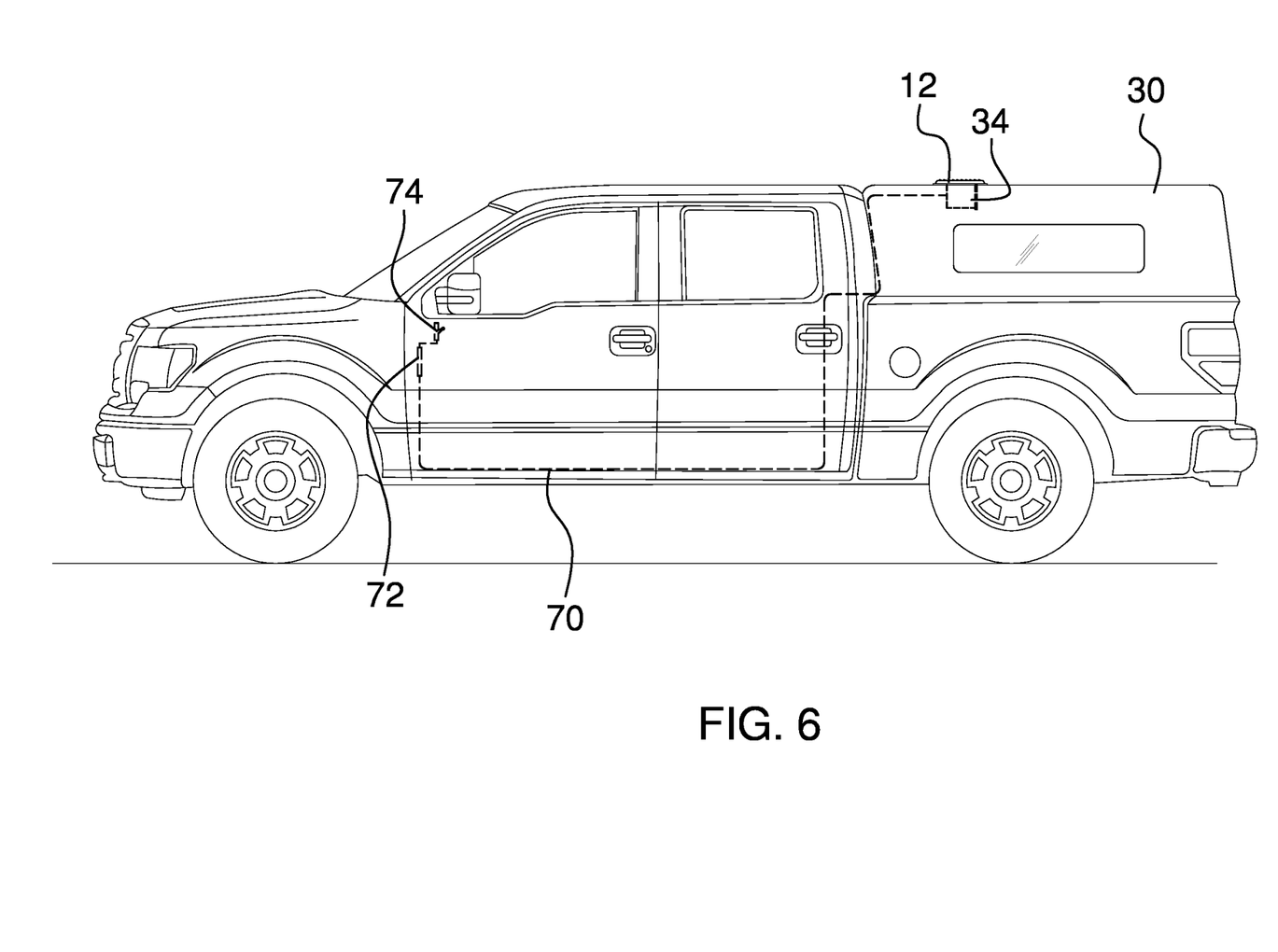
FIG. 6 is an in-use view of an embodiment of the disclosure.
Figure 7:
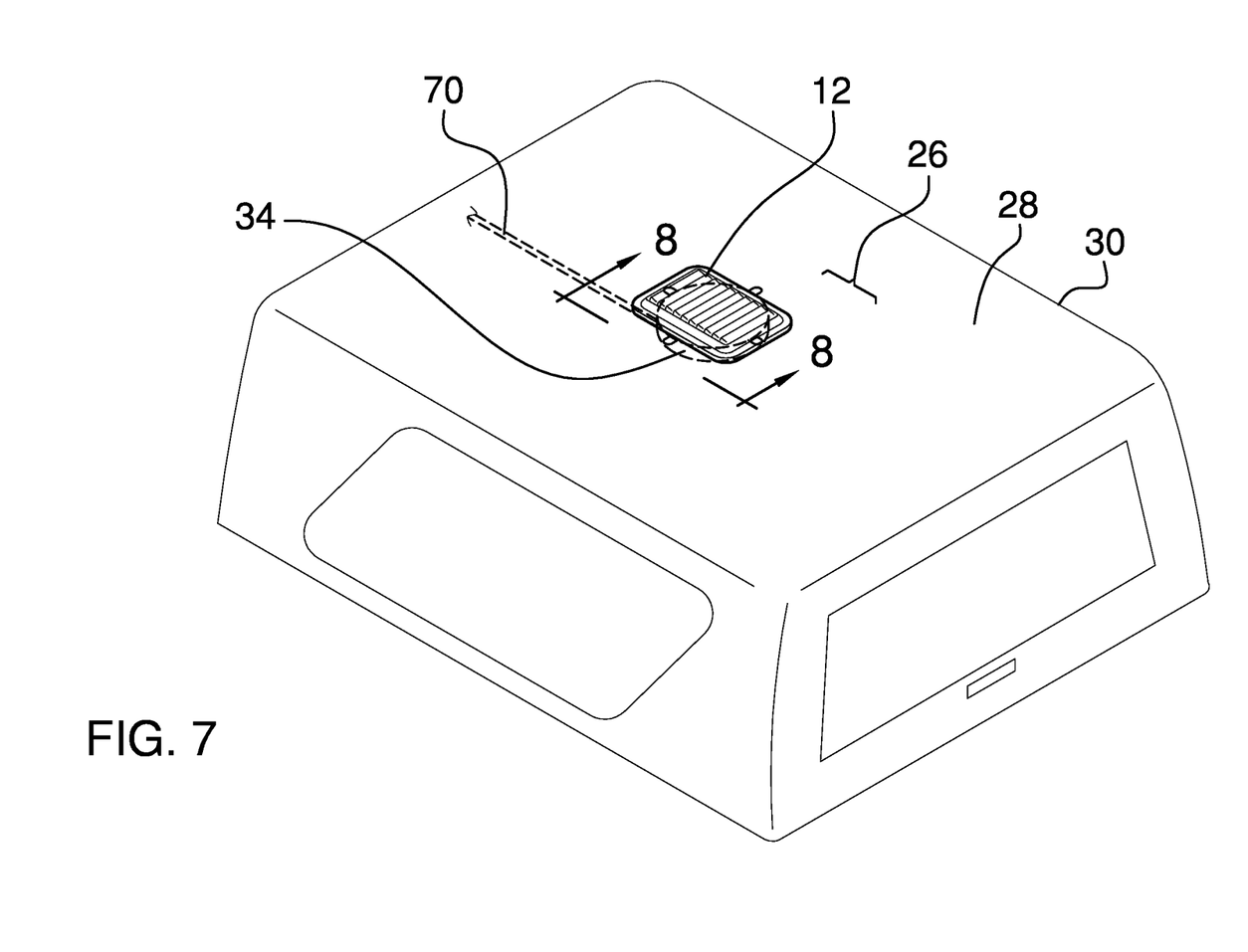
FIG. 7 is an isometric view of an embodiment of the disclosure.
Figure 8:
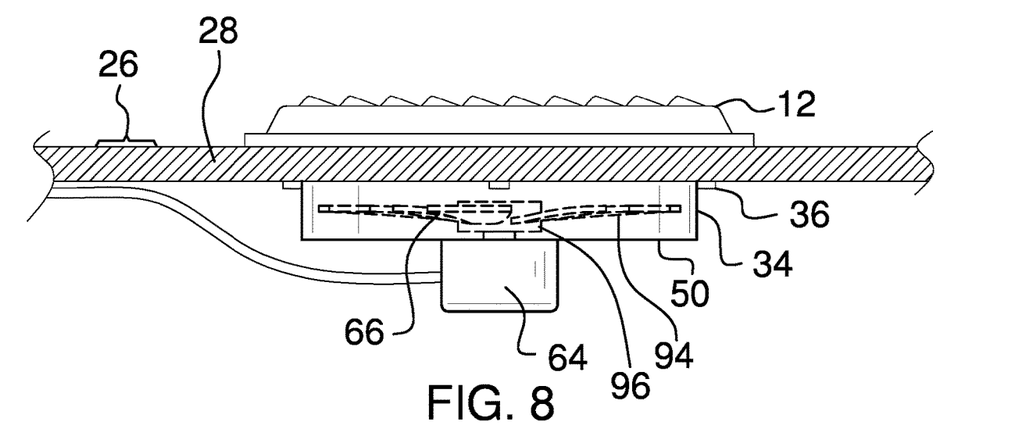
FIG. 8 is a cross-sectional view of an embodiment of the disclosure along the line 8-8 of FIG. 7.
Figure 9:
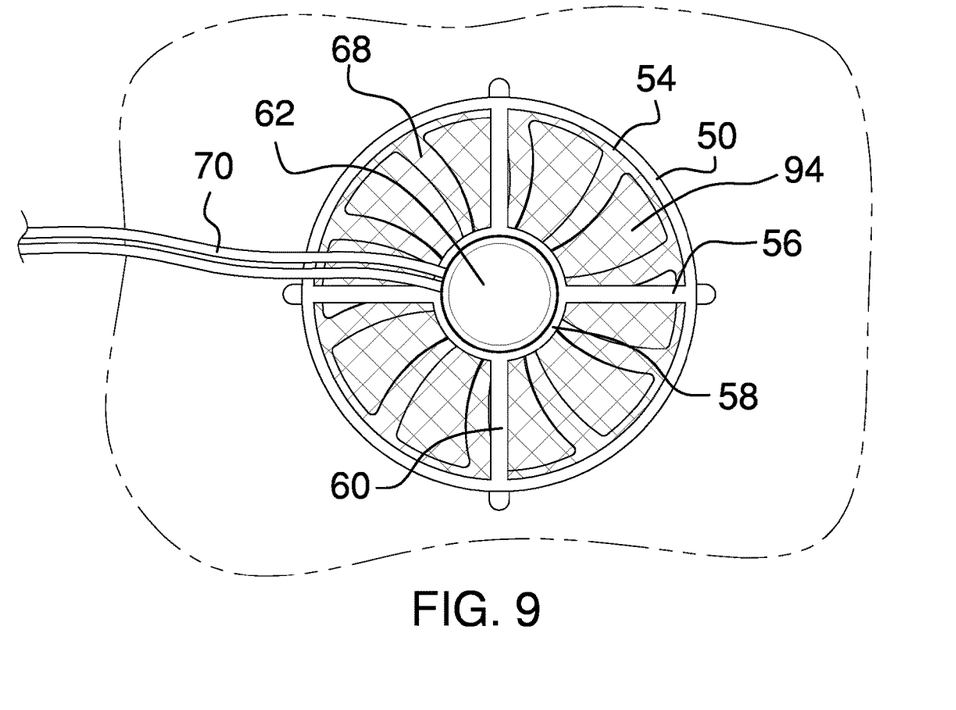
FIG. 9 is a bottom plan view of an embodiment of the disclosure.

A blower body 34 is coupled to the vent body 12. The blower body 34 has a blower flange 36 configured to be coupled to an inner side 38 of the shell top 28 of the camper shell below the vent body 12 and is open to the vent 12 to be in fluid communication. The blower body 34 has a blower front side 40, a blower back side 42, a blower left side 44, and a blower right side 46 extending from the blower flange 36 and defining a blower interior 48. As shown in FIGS. 7-9, the blower body 34 may alternatively be circular in shape and solid around the circumference, extending 2-3 inches below the inner side 38 of the shell top. A blower bottom side 50 has an exhaust aperture 52 extending through to the blower interior 48 and the blower front side 40 has an output aperture 54 extending through to the blower interior 48. The output aperture 54 may occupy the entirety of the blower bottom side 50 in the embodiment shown in FIGS. 7-9. The blower front side 40 and the blower right side 46 are rounded and the blower left side 44 is flat. The blower front side 40 and the output aperture 54 are square. The blower bottom side 50 may have a grate 56 covering the exhaust aperture 52. The grate 56 comprises an annular inner portion 58 and a plurality of support arms 60 extending from the annular inner portion 58 to a perimeter of the exhaust aperture 52. The plurality of support arms 60 may be a set of four support arms 60 spaced 90° apart.

A blower 62 is coupled to the blower body 34. The blower 62 is in fluid communication with each of the vent aperture 20 and the output aperture 54 to blow air into the camper shell 30. The blower 62 has a motor 64, a circular blade array 66 coupled to the motor 64, and a cage 68 surrounding the blade array 66. The circular blade array 66 may be in the form of a blower wheel 98 as shown in FIGS. 1 through 6. Alternatively, a horizontal fan assembly 90 having a plurality of blades 94 extending radially from a hub 96 in a generally planar configuration may be used, as shown in FIGS. 7 through 9, to direct airflow through the output aperture 54. The blower 62 has a wiring 70 configured to be in operational communication with a fuse box 72 of the pickup truck. A power switch 74 is configured to be coupled within a cab 76 of the pickup truck and in operational communication with the fuse box 72 to control the blower 62. The power switch 74 may be a toggle switch.

In use, the power switch 74 is used as desired to activate the blower 62 to bring air in through the vent aperture 20 to ventilate the camper shell 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A camper shell ventilation apparatus comprising:
   a vent body, the vent body having a vent top side, a vent bottom side, and a vent sidewall, a vent aperture extending from the vent top side through the vent bottom side, the vent bottom side being configured to be coupled to an outer side of a shell top of a camper shell of a pickup truck;
   a blower body coupled to the vent body, the blower body having a blower flange configured to be coupled to an inner side of the shell top of the camper shell below the vent body, the blower body having a blower front side, a blower back side, a blower left side, and a blower right side extending from the blower flange and defining a blower interior, a blower bottom side having an exhaust aperture extending through to the blower interior, the blower front side having an output aperture extending through to the blower interior;
   a blower coupled to the blower body, the blower being coupled within the blower interior and being in fluid communication with each of the vent aperture and the output aperture to blow air into the camper shell, the blower having a wiring configured to be in operational communication with a fuse box of the pickup truck; and
   a power switch, the power switch being configured to be coupled within a cab of the pickup truck and in operational communication with the fuse box to control the blower.

2. The camper shell ventilation apparatus of claim 1 further comprising the vent top side having a perimeter portion and a raised central portion, the raised central portion being louvered.

3. The camper shell ventilation apparatus of claim 1 further comprising the blower front side and the blower right side being rounded, the blower left side being flat, the blower front side and the output aperture being square.

4. The camper shell ventilation apparatus of claim 1 further comprising the blower having a motor, a circular blade array coupled to the motor, and a cage surrounding the blade array.

5. The camper shell ventilation apparatus of claim 1 further comprising the blower bottom side having a grate covering the exhaust aperture.

6. The camper shell ventilation apparatus of claim 5 further comprising the grate comprising an annular inner portion and a plurality of support arms extending from the annular inner portion to a perimeter of the exhaust aperture.

7. A camper shell ventilation apparatus comprising:
   a vent body, the vent body having a vent top side, a vent bottom side, and a vent sidewall, a vent aperture extending from the vent top side through the vent bottom side, the vent top side having a perimeter portion and a raised central portion, the raised central portion being louvered, the vent bottom side being configured to be coupled to an outer side of a shell top of a camper shell of a pickup truck;
   a blower body coupled to the vent body, the blower body having a blower flange configured to be coupled to an inner side of the shell top of the camper shell below the vent body, the blower body having a blower front side, a blower back side, a blower left side, and a blower right side extending from the blower flange and defining a blower interior, a blower bottom side having an exhaust aperture extending through to the blower interior, the blower front side having an output aperture extending through to the blower interior, the blower front side and the blower right side being rounded, the blower left side being flat, the blower front side and the output aperture being square, the blower bottom side having a grate covering the exhaust aperture, the grate comprising an annular inner portion and a plurality of support arms extending from the annular inner portion to a perimeter of the exhaust aperture;

a blower coupled to the blower body, the blower being coupled within the blower interior and being in fluid communication with each of the vent aperture and the output aperture to blow air into the camper shell, the blower having a motor, a circular blade array coupled to the motor, and a cage surrounding the blade array, the blower having a wiring configured to be in operational communication with a fuse box of the pickup truck; and a power switch, the power switch being configured to be coupled within a cab of the pickup truck and in operational communication with the fuse box to control the blower.

8. A camper shell ventilation apparatus comprising:

a vent body, the vent body having a vent top side, a vent bottom side, and a vent sidewall, a vent aperture extending from the vent top side through the vent bottom side, the vent top side having a perimeter portion and a raised central portion, the vent sidewall having a plurality of vent slot apertures, the vent bottom side being configured to be coupled to an outer side of a shell top of a camper shell of a pickup truck;

a blower body coupled to the vent body, the blower body having a blower flange configured to be coupled to an inner side of the shell top of the camper shell below the vent body, the blower body being round and extending from the blower flange and defining a blower interior, a blower bottom side having an exhaust aperture extending through to the blower interior, the exhaust aperture occupying the entirety of the blower bottom, the blower front side having an output aperture extending through to the blower interior, the blower front side and the blower right side being rounded, the blower left side being flat, the blower front side and the output aperture being square, the blower bottom side having a grate covering the exhaust aperture, the grate comprising an annular inner portion and a plurality of support arms extending from the annular inner portion to a perimeter of the exhaust aperture;

a blower coupled to the blower body, the blower being coupled within the blower interior and being in fluid communication with each of the vent aperture and the output aperture to blow air into the camper shell, the blower having a motor, and a circular blade array coupled to the motor, the blower having a wiring configured to be in operational communication with a fuse box of the pickup truck; and a power switch, the power switch being configured to be coupled within a cab of the pickup truck and in operational communication with the fuse box to control the blower.

\* \* \* \* \*